United States Patent
Zhang et al.

(10) Patent No.: US 6,829,704 B2
(45) Date of Patent: Dec. 7, 2004

(54) METHOD AND SYSTEM TO AUTOMATICALLY ACTIVATE SOFTWARE OPTIONS UPON INITIALIZATION OF A DEVICE

(75) Inventors: Kun Zhang, Waukesha, WI (US); Karamjeet Singh, Germantown, WI (US); William G. Blair, Waukesha, WI (US); Winnie C. Durbin, Dousman, WI (US); Michael R. Minogue, Milwaukee, WI (US)

(73) Assignee: General Electric Company, Milwaukee, WI (US)

( * ) Notice: Subject to any disclaimer, the term of this patent is extended or adjusted under 35 U.S.C. 154(b) by 746 days.

(21) Appl. No.: 09/681,481

(22) Filed: Apr. 13, 2001

(65) Prior Publication Data

US 2002/0161990 A1 Oct. 31, 2002

(51) Int. Cl.[7] .................. G06P 15/177; H04K 1/00; H04L 9/32
(52) U.S. Cl. .................. 713/1; 713/182; 713/200
(58) Field of Search .................. 713/1, 182, 200; 710/8

(56) References Cited

U.S. PATENT DOCUMENTS

| 5,442,541 | A | * | 8/1995 | Hube et al. ............ 700/9 |
| 6,301,666 | B1 | | 10/2001 | Rive |
| 6,490,684 | B1 | * | 12/2002 | Fenstemaker et al. ...... 713/182 |
| 6,581,069 | B1 | * | 6/2003 | Robinson et al. ........ 707/104.1 |
| 6,694,384 | B1 | * | 2/2004 | Moeller et al. ................. 710/8 |

FOREIGN PATENT DOCUMENTS

JP          2000148313 A  *  5/2000  ............. G06F/1/26

OTHER PUBLICATIONS

IBM, Remote Activation of Computer Terminals, May 1, 1982, IBM Technical Disclosure Bulletin, vol. 24, Issue 12, pp. 6309–6310.*

* cited by examiner

Primary Examiner—Dennis M. Butler
Assistant Examiner—Suresh Suryawanshi
(74) Attorney, Agent, or Firm—Ziolkowski Patent Solutions Group, LLC; Michael A. Della Penna; Carl B. Horton

(57) ABSTRACT

A system and method are provided for activating inactive software options pre-installed on a device upon initialization of the device and thereby preventing installation during device operation. The invention includes receiving a request from a user at a centralized facility for access to an inactive option resident on the device. After validation of the request, an option-specific activation key or code is generated at the centralized facility using data from at least one of a user identifier, a system identifier, a host identifier, a use period identifier, and the selected option. The activation key is then transmitted from the centralized facility to the device whereupon only during initialization or reboot of the device is access to the inactive option automatically granted. The limiting of access to the inactive option until device initialization ensures that option enablement is prevented during device operation.

34 Claims, 2 Drawing Sheets

METHOD AND SYSTEM TO AUTOMATICALLY ACTIVATE SOFTWARE OPTIONS UPON INITIALIZATION OF A DEVICE

BACKGROUND OF INVENTION

The present invention relates generally to a method and system for enabling software, and more particularly, to remotely activating upon a device initialization inactive software options resident in memory of the device.

Information exchange between a centralized facility and remote medical diagnostic devices and supporting systems, such as medical imaging systems, has steadily improved in recent years. Examples of systems capable of exchanging information remotely include magnetic resonant imaging (MRI) systems, computed tomography (CT) systems, ultrasound and x-ray systems, and positron emission tomography (PET) systems. Typically, these systems are factory configured having multiple options that may or may not be utilized by a customer or user. Some known systems permit a user to configure a device according to the user's needs, but these systems require the user to determine and, often, guess as to what features will be needed in the future. To further complicate matters, users owning multiple devices often desire to network the devices even though activated options on the devices may vary.

Known systems attempt to sense on-going customer needs by arranging for a service technician to physically travel to the location of the device, install and enable the option, and in some cases, calibrate the device to ensure proper operation. Since service calls are normally conducted during device operation periods, the service calls result in unnecessary delay and device down time while installation of the new software application on the device is completed. Further, the user is limited as to when installation of a key to enable the option can occur. Even if demand for usage of the device having the selected options for enablement peaks around the date of the service call, it is generally not economical or efficient for a user to reschedule the service call. Rescheduling may deny access to options desired to be activated for an extended period of time. Additionally, a user may be charged fees associated with the cancellation and rescheduling of the service call.

Further advancements provide remote service to medical diagnostic systems in an effort to allow a level of service on a continual and interactive basis as needed by many facilities. In one such system, a facility can interactively receive messages via a network and can respond automatically to the messages if configured correctly. Data required to analyze a state of operation of the medical diagnostic device can be transferred and immediately stored for use during an electronic connection. This technique greatly facilitates identification of system problems, allows questions to be posed to the centralized facility, facilitates rapid transfer of updates and imaging protocols, and permits standard and customized reports to be automatically transmitted to subscribing systems or facilities without further user input or acceptance. The non-user interactive aspect of this technique allows the medical diagnostic facility to remain current on services provided by the centralized facility and to readily communicate with the facility.

Often, healthcare or other facilities desire to minimize initial purchase price expenditures by limiting the number of options that are activated. Later, as demand for inactive options increases, a facility may request activation of an option by sending a request to a centralized facility. After authentication of the request, it is then processed. Current solutions for processing the request include automatic direct downloading and installing of a software application to the device upon user selection of the option desired to be activated, or manual electronic transfers during service calls. These processes immediately install the software application in the device, independent and regardless of device operation status.

While such solutions and the provision of remote services to medical diagnostic devices have greatly enhanced the level of service and data exchange, it is not always desirable to immediately permit data exchange, especially installation of a software code while a device is in operation, such as when a medical imaging device is conducting an imaging scan. Furthermore, although advancements in data exchange have provided for automatic data transfers between a centralized facility and remotely located devices, they have not been able to ensure that installation is prevented during an active imaging session. Therefore, there is a need for providing a system and method of delaying activation of inactive options resident in memory of a device while the device is active or in use.

It would therefore be desirable to design a method and system to automatically activate options resident in memory of a device upon reboot of the device, thereby preventing automatic installation of options during device operation.

SUMMARY OF INVENTION

The present invention is directed to a system and method to activate software options in a device upon initialization of the device located remotely from a centralized facility for a selected time period after the centralized facility transmits an enabling key to the device sometime prior to a present initialization of the device to overcome the aforementioned problems.

The present invention includes hardware and software to enable, upon reboot of a device, such as a medical imaging scanner, inactive software applications stored in memory of the device. The device comprises a computerized network, a receiving center connected to the computerized network, and a processing station located within the receiving center and having one or more processors. The computerized network connects the receiving center to the device through an external communication network, such as the Internet, direct dial-up links, an intranet, or a wireless platform. The computerized network is designed such that the processors of the processing station are configured to receive a request from a user for activation of an inactive software application resident on the device. After receipt of the request, the one or more processors generate an electronic enabler configured to activate the software application. The processors then transmit the electronic enabler from the receiving center to the device. Transmission of the enabler can occur by email, direct download through the external communications network, transmission over a public or private communication line, or any other viable transmission means. The device further includes a processor which is programmed to control access to the inactive software application and verify transmission of the electronic enabler. If the electronic enabler is transmitted, the processor of the device determines a device operation status as active or inactive according to device operation at the time of receipt of the transmission. If the status is determined as active, the processor of the device prohibits activation and enablement of the software application until device initialization or reboot. If, however, the status is an inactive status, then the device processor automatically activates and enables the software application with device reboot. Alternatively, user authorization can be required prior to activation and enablement of the software application.

In accordance with the process of the present invention, a method to enable software options is disclosed that includes receiving an electronic request for activation of an inactive option in memory of a device located remotely from a centralized facility. The method further determines whether to activate the inactive option in response to the electronic request based on whether a set of criteria has been satisfied. The criteria is defined at the centralized facility and can include a number of parameters, including a user identifier, a system identifier, a host identifier, an option identifier, modality, and a period-of-use identifier. If the set of criteria is unsatisfied, use of the inactive option is denied. If the set of criteria is satisfied, the method generates an activation key configured to permit use of the inactive option upon installation of the key in the device, and further sends the activation key from the centralized facility to the device, wherein the activation key is automatically installed upon initialization of the device.

In accordance with another aspect of the present invention, a computer data signal embodied in a carrier wave and representing a set of instructions which, when executed by a processor, will cause the processor to review, at a centralized facility, a request from a user to activate a software application stored in memory of a device located remotely from the centralized facility. The processor of the centralized facility determines whether a user is qualified, and if so, generates a software script designed to enable the software application. The processor then transmits the software script from the centralized facility to the device thereby enabling the software application, but only upon reboot of the device.

In accordance with yet another aspect of the invention, a software enabling system is disclosed comprising a device remotely located from a centralized facility and configured to receive transmissions from the centralized facility, wherein the device includes one or more inactive applications resident in memory and a computer to control the one or more inactive applications. The system further includes a data script creator, wherein the creator is designed to generate a data script configured to enable a user selected inactive application. The data script is further configured to automatically enable the selected inactive application upon initialization, or reboot, of the device. Preferably, the data script is specific to one or more of a system identifier, an application identifier, a period-of-use identifier, and a host identifier.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings.

DETAILED DESCRIPTION

Figure 1:
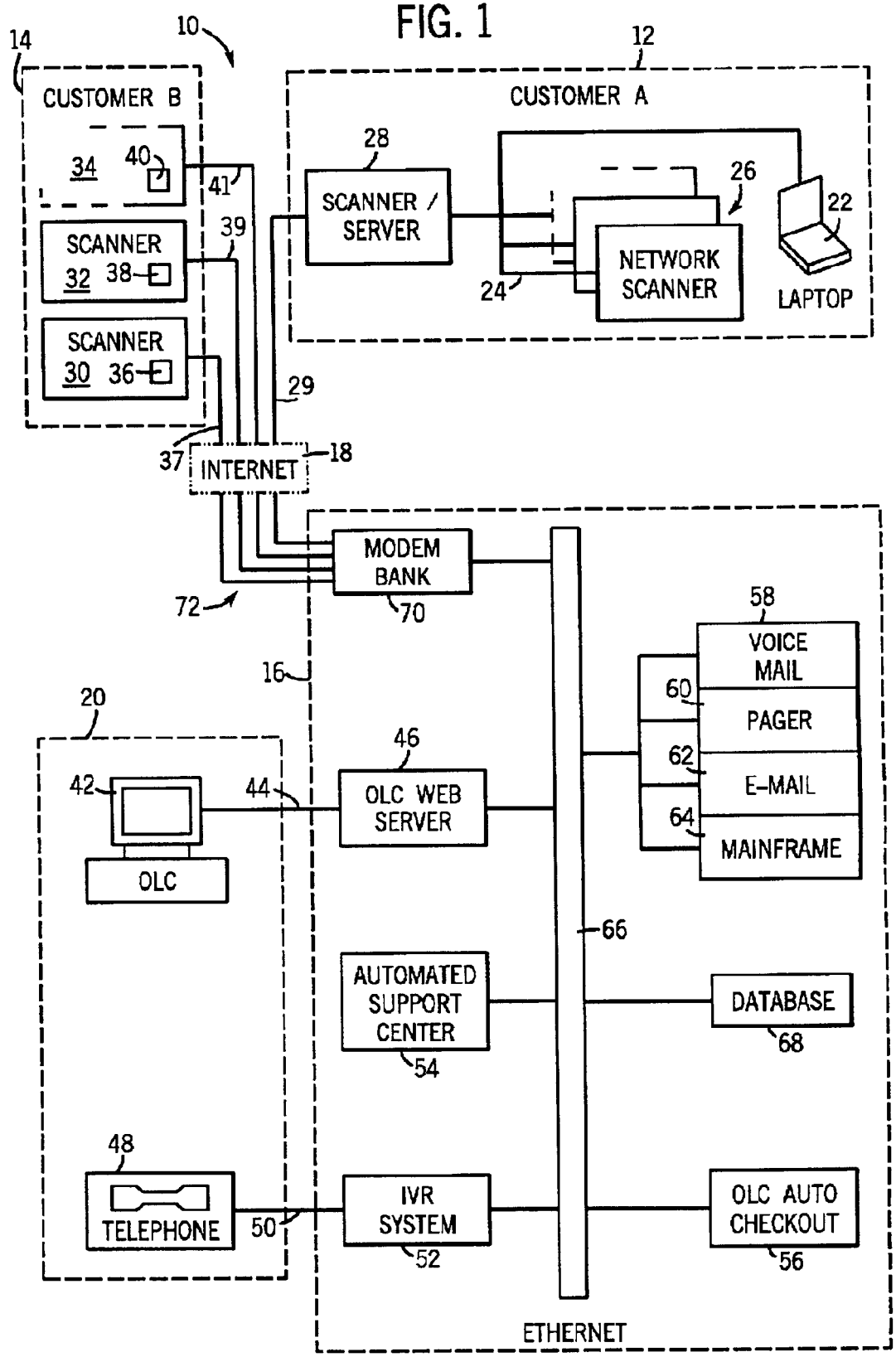
FIG. 1 is a block diagram of a system for which the present invention is implemented therein.

Referring to FIG. 1, an overview block diagram of a medical diagnostic and service networked system 10 is shown which includes a plurality of remote user or customer stations, such as Customer A referenced with numeral 12, and Customer B referenced with numeral 14. It is understood, that the number of user stations can be limitless, but two specific embodiments are shown with Customer A and Customer B, which will be further explained hereinafter. The user stations 12, 14 are connected to a receiving center or centralized facility 16 through a communications link, such as a network of interconnected server nodes 18 or a remote link 20. Although a single centralized facility is shown and described, it is understood that the present invention contemplates the use of multiple centralized facilities, each capable of communication with each user station. Each user station has operational software associated therewith which can be configured, serviced, maintained, upgraded, monitored, enabled or disabled by the centralized facility 16.

The various systems disclosed are configured to be selectively linked to the centralized facility 16 by either the remote link 20, or in the example of user station 12, a laptop computer 22 connected to an internal network 24 of Customer A. Such selective linking is desirable to provide upgrades, maintenance, service, and general monitoring of the various systems and equipment at a customer site, which includes accessing data from the systems and transmitting data to the systems, for example.

In general, a customer site may have a number of devices such as a variety of medical diagnostic systems of various modalities. As another example, in the present embodiment, the devices may include a number of networked medical image scanners 26 connected to an internal network 24 served by a single scanner 28 having a workstation configured to also act as a server, or configured as a stand-alone server without a medical image scanner associated therewith.

Alternately, a user station, or customer site 14 can include a number of non-networked medical image scanners 30, 32, and 34 each having a computer or work station associated therewith and having an internal modem 36, 38, and 40 to connect the remote user station to a communications link, such as the Internet 18 through links 37, 39, and 41, respectively, to communicate with the centralized facility 16. Internet 18 is shown in phantom to indicate that an external communications network can include Internet 18, together with communication links 29, 37, 39, and 41, or alternatively, can include direct dial-up links through dedicated lines, an intranet, or public communications systems.

It is understood that each of the network scanners 26 has its own workstation for individual operation and are linked together by the internal network 24 so that the user can have a centralized management system for each of the scanners. Further, such a system is provided with communications components allowing it to send and receive data over a communications link 29. Similarly, for the non-networked medical image scanners at remote user station 14, each of the scanners 30, 32, and 34 have individual communications links 37, 39, and 41. Although FIG. 1 shows each of these links connected through an open network 18, these links can permit data to be transferred to and from the systems over a dedicated network as well.

The embodiment shown in FIG. 1 contemplates a medical facility having such systems as magnetic resonance imaging (MRI) systems, ultrasound systems, x-ray systems, computed tomography (CT) systems, nuclear systems, cardiology systems, positron emission tomography (PET) systems, or any other type of medical imaging system, however, the present invention is not so limited. Such facilities may also provide services to centralized medical diagnostic management systems, picture archiving and communications systems (PACS), teleradiology systems, etc. Such systems can be either stationary and located in a fixed place and available by a known network address, or be mobile having various network addresses varying for different geographic or physical locations of the device. In the embodiment shown in FIG. 1, each user station 12, 14 can include any combination of the aforementioned systems, or a user station may have all of a single type of system. A user station can also include a single medical image scanner. Mobile diagnostic systems can be configured similarly to that of user station 12 or user station 14. Such mobile diagnostic systems can include equipment of various modalities, such as MRI, CT, ultrasound, or x-ray systems and are mobilized in order to service patients at various medical facilities.

A request for access to and enablement of software options or applications of the present invention can be initiated by authorized personnel, such as an on-line engineer or technician, or a customer administrative personnel from a computer or workstation 42 in the remote link 20, which can be a part of the centralized facility 16, or be separately connected to the centralized facility 16 by a dialup link 44 to a web server 46 in the centralized facility 16. Alternatively, it is contemplated that the system could be initialized by a laptop computer 22 connected to a customer internal network 24, or individually connected to each of the scanners 30, 32, or 34. The remote link 20 can also serve to connect the centralized facility 16 to a user station by a telephone and telephone connection 48 through a conventional telephone network 50 and to an interactive voice recognition system (IVR) 52 in the centralized facility 16. The centralized facility 16 includes a number of processing systems including computers for the IVR system 52, an automated support center 54, the web server 46, and an auto checkout server 56, for processing customer and product data and creating an appropriate configuration file. Other processor systems include computers to maintain a voicemail system 58, a pager system 60, an email system 62, and a main frame 64, and more generally, an output report generator and notifier. Each is connectable and can transmit data through a network, such as an Ethernet 66 with one another, and/or with at least one database 68. However, it is understood that the single representation of a database in FIG. 1 is for demonstrative purposes only, and it is assumed that there is a need for multiple databases in such a system. It is also understood that the IVR system is not only a voice recognition system, but can also process interactive keypad entry from a touchtone telephone 48. A bank of modems 70 is connected to the Ethernet 66 to relay data from the centralized facility 16 to the remote user stations 12, 14 through a plurality of modem links 72.

As previously discussed, each of the systems and substations described herein and referenced in FIG. 1 may be linked selectively to the centralized facility 16 via a network 18. According to the present invention, any acceptable network may be employed whether public, open, dedicated, private, or so forth. The communications links to the network may be of any acceptable type, including conventional telephone lines, fiber optics, cable modem links, digital subscriber lines, wireless data transfer systems, or the like. Each of the systems is provided with communications interface hardware and software of generally known design, permitting them to establish network links and exchange data with the centralized facility 16. The systems are provided with interactive software so as to configure the systems and exchange data between the user stations and the centralized facility 16. In some cases, during periods when no data is exchanged between the user stations and the centralized facility, the network connection can be terminated. In other cases, the network connection is maintained continuously.

The present invention includes a method and system for granting use of resident software options in a remotely located device. As previously indicated, the device, including medical imaging equipment, includes installed software that controls options or device capabilities that are typically enabled or disabled manually by a field engineer on-site in response to a request for use of the options from a qualified customer or user. The present invention, however, is directed toward a method and system to enable use of an inactive option upon device reboot or initialization. Enablement can be automatic or upon user authorization.

From a centralized facility, and after appropriate authentication of the user and validation of the system identification and user's status, an electronic enabler or activation key is generated in the centralized facility 16 and electronically transmitted to a device via the communication links 29, 37, 39, 41, and/or 72, FIG. 1, preferably over a private communication link, but other public communications systems can work equally well, such as direct dial-up Internet, or wireless communications. As previously set forth, it is understood that external communications links include a closed intranet system, an open public communications system, or a combination thereof.

Figure 2:
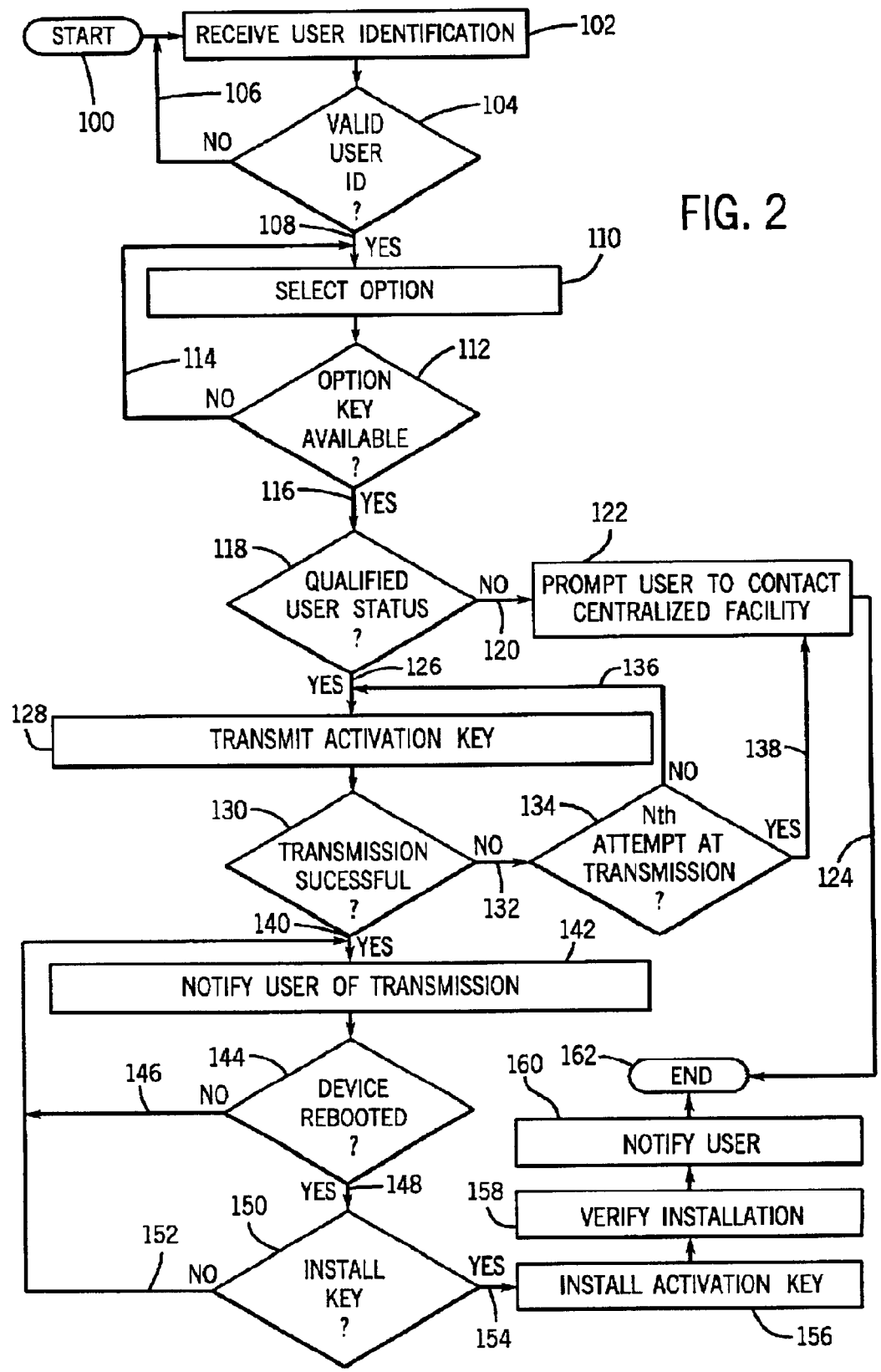
FIG. 2 is a flow chart showing a process of the present invention and implemented in the system of FIG. 1.

Referring to FIG. 2, once the method and/or computer program is initiated 100, customer or user identification is input electronically by a user or an authorized field engineer, at a remote customer station or remote link, and received at the centralized facility 102. The centralized facility then validates the user identification at 104. Validation of the user identification is determined according to a user identifier and a password. If the user identification is not validated 106, the user is prompted to re-enter a new user identifier and password at 102. If a valid user identifier is not received, a request will not be considered by the centralized facility.

After a user identification is validated 104, 108, the user selects a particular software option or application desired to be enabled and further requests access to that option at 110. Selection of the option requires the user to enter data from a graphical user interface (GUI). The GUI prompts the user to input a system identifier identifying the particular device that the user wishes to activate options thereon as well as enter a host identifier that further identifies the physical location of the device. The GUI also provides drop-down menus for the user to select the modality of the device such as a CT scan, MRI scan, PET scan, etc. and a usage period comprising one of indefinite, pay-per-use, limited access, and trial basis. The user additionally selects from another drop-down menu of the GUI the option or application desired to be enabled. Additionally, a field can be created to permit the user to enter an email address or ID for communication with the centralized facility. A field can also be provided to permit customer comments when entering the request.

After completion of data entry and selections by the user, the request is then transmitted to the centralized facility for further processing. At the centralized facility, a determination is made to decide whether an option key is available 112 for the criteria submitted. Determination of key availability comprises identifying a host identifier, system identifier, selected option, and determining a modality and period of use. The centralized facility can compare and consider the user-entered data with information stored in a database to determine key availability. If the option key is not available 114, for example, if the option is permanently enabled already, then the user is directed to select a new option at 110. On the other hand, if the option key is determined to be available 112, 116, then a determination is made of whether or not the user is qualified 118.

Whether to grant access to and use of an option in response to a user request is achieved by determining if a set of criteria defining the user's status has been met. Satisfaction of the set of criteria defines a user's status as qualified. Once determination by the central facility that the set of criteria has been satisfied, a user's request is then processed granting access to and use of the inactive option. Alternatively, if the user fails to meet the set of criteria, or fails to maintain on a continual basis a qualified user status, then the user's status is defined as unqualified and access to and use of an option may be terminated.

The set of criteria may include a number of parameters which preferably are stored in a database in the centralized facility. For example, the set of criteria may require a current account balance or an established line of credit. The set of criteria may also include data such as a valid user identifier, system identifier, software option identifier, host identifier, or use request identifier. In this manner, access to options can be limited to assure user observance of regulatory measures, proper use of new and/or updated options, and compliance with educational training programs and maintenance schedules. Furthermore, access to and use of the option may be denied for delinquent or past due account balances, unavailable credit, a poor credit history, or other accounting concerns.

To further assist users or customers having a customer status defined as unqualified 120, the user is prompted to contact a customer service representative at the centralized facility 122. After instructing the user to contact the centralized facility at 122, the user then exits at 124 and the method ends 162. After a user has reinstated their user status to qualified, the user may start the process of requesting enablement anew at 100.

Once the user's status is determined as qualified 118, 126, the activation key or electronic enabler is generated at the centralized facility and transmitted to memory of the device 128. The activation key is preferably an alphanumeric software key or code that is programmed to enable a specific software option on a particular device to prevent the possibility of unauthorized use. A date/time stamp is embedded within the key that provides access to and use of the option upon installation of the key for the specified time. In other embodiments, upon transmission of the activation key 128, an agreement or license defining the user's rights to access and use the inactive option may be created or alternatively an automatic billing invoice generated and sent to the user.

After transmission 128, a determination is made whether the transmission of the activation key is successful 130. If transmission is not successful 132, then the system checks whether previous attempts to transmit the activation key have occurred 134. If attempted transmissions of the key have occurred less than N times 136, then the key is re-transmitted at a later time period 126, 128. The value of "N" is completely arbitrary and may be selected by the centralized facility. The value of "N" should permit sufficient leeway to account for transmission error, but also be such that unsuccessful attempts are not compounded with repetitious download failures. Upon the Nth attempted key transmission 134, 138, the user is prompted to contact the centralized facility 122 and leaves the process at 124, 162.

If a transmission is successful 130, 140 then the activation key is stored in memory of the device and the user is notified of activation key transmission 142. Preferably, the notification occurs by transmission of an electronic notification message from the centralized facility to the user and/or the remote user station.

After notification of activation key transmission 142, the system then determines whether the device has been initialized or rebooted 144. Determination of device reboot ensures that the device is not in operation, e.g., scanning a subject, while installation of the activation key occurs and thus also permits downloading of the key at any time. Initialization of the device can occur by turning off and restarting the device, a loss of power to the device, manually selecting restart of the device, or any other mechanism that provides for initialization of the operating system of the device. If the device is not rebooted after receipt of the activation key 146, then the user is notified of transmission of the key at 140 and again reminded to install the key by rebooting the device. After rebooting the device 144, 148, the system then determines whether to install the key 150. If the user decides not to install the key 152, then the system again returns to 140 providing another opportunity to install the key once the device is again rebooted. If the user decides to proceed with installation of the key 150, 154, then the activation key is installed 156 for the requested inactive option. The system next verifies installation of the key 158 and notifies the user of installation 160, after which the requesting and installation process ends at 162.

Further, in an alternate embodiment, after installation of the activation key, the system can be designed to monitor the user or customer status of a user and deactivate the activated option upon a change in the status from qualified to unqualified and/or when a pre-specified time of use expires.

Accordingly, the present invention includes a method to enable software options that includes receiving a request for activation of an inactive option in memory of a device located remotely from a centralized facility. The receiving station, or centralized facility then determines whether to activate the inactive option in response to the request based on whether a set of criteria, such as a host identifier, a user identifier, a system identifier, usage period, modality, or selected option has been satisfied. If the set of criteria is unsatisfied, then use of the inactive option is denied to the user. If however, the set of criteria is satisfied, then the method generates an activation key configured to permit use of the inactive option upon installation of the key in the device and further sends the activation key from the centralized facility to the device, wherein the activation key is automatically installed upon initialization of the device and enables the inactive option. Preferably, the software to run the inactive option is already installed in the device; however, it is within the realm of the present invention that such software can also be transmitted with the activation key. The activation key is designed to enable the option for a predetermined time period depending upon the usage period selected by the user.

In accordance with another aspect of the present invention, a system capable of enabling an inactive software application is disclosed, wherein the software application is resident in memory of a device. The system comprises a computerized network and a receiving center connected thereto. A processing station having a processor is also located within the receiving center. The processor is configured to receive a request from a user for activation of at least one inactive software application resident on the device and generate an electronic enabler configured to activate the inactive software application. The generated electronic enabler is then transmitted by the processors from the receiving center to the device. The device includes a remote processor programmed to control access to the inactive software application and verifies transmission of the electronic enabler. If the electronic enabler is transmitted, the device processor further determines a device operation status as one of active or inactive. If an inactive status is determined, the processor of the device prohibits activation of the at least one inactive software application. If an active status is determined, the device processor enables the inactive software application.

Accordingly, the invention also includes a computer data signal embodied in a carrier wave and representing a set of instructions which, when executed by at least one processor, causes the at least one processor to review at a centralized facility a request from a user to activate an inactive software application stored in memory of a medical imaging device located remotely from the centralized facility. The processor further determines whether a user is qualified, and if so generates a software script designed to enable the software application. The processor then transmits the software script from the centralized facility to the device such that the software application is enabled only during a reboot of the device. Alternatively, user authorization can be required prior to enablement.

In accordance with yet another embodiment of the invention, a software enabling system is disclosed comprising a medical imaging device remotely located from a centralized facility and configured to receive transmissions from the centralized facility, wherein the medical imaging device includes a computer having one or more inactive applications resident in memory of the computer. The system further includes a data script creator designed to generate a data script configured to enable a selected inactive application, wherein the data script is further configured to automatically enable the selected inactive application only upon initialization of the device. The centralized facility may include one or more computers with computer readable mediums having thereon a set of instructions that when executed, causes the one or more computers to transmit the data script to the medical imaging scanner for automatic installation when the medical imaging scanner is inactive.

The present invention has been described in terms of the preferred embodiment, and it is recognized that equivalents, alternatives, and modifications, aside from those expressly stated, are possible and within the scope of the appending claims.

What is claimed is:

1. A method to enable software options comprising the steps of:
   receiving a request for activation of an inactive option in memory of a device located remotely from a centralized facility;
   determining whether to activate the inactive option in response to the electronic request based on whether a set of criteria has been satisfied;
   if unsatisfied, denying use of the inactive option;
   if satisfied, generating an activation key configured to permit use of the inactive option upon installation in the device;
   sending the activation key from the centralized facility to the device; and
   automatically installing the activation key and enabling the inactive option upon initialization of the device.

2. The method of claim 1 wherein initialization of the device includes rebooting the device.

3. The method of claim 1 wherein the device includes a medical imaging scanner and further includes the step of preventing activation of the inactive option during an imaging scan.

4. The method of claim 1 further comprising the steps of:
   verifying activation of the inactive option; and
   if verified, notifying a user of activation of the inactive option.

5. The method of claim 1 further comprising the step of prompting a user for an authorization to install the activation key and receiving the authorization from the user prior to installation of the activation key.

6. The method of claim 1 further comprising the steps of:
   accessing a graphic user interface (GUI) from a user station;
   selecting the inactive option sought to activate; and
   transmitting an option identifier to the centralized facility.

7. The method of claim 6 further comprising the step of electronically sending a user identifier and a system identifier to the centralized facility.

8. The method of claim 1 wherein the step of receiving the request for activation of an inactive option further includes the steps of:
   determining a host identifier;
   determining a system identifier;
   identifying a modality; and
   identifying a use period including one of a trial use period, a limited use period, a pay-per use period, and an indefinite use period.

9. The method of claim 1 further comprising the step of sending the request electronically.

10. The method of claim 1 wherein the step of determining if the set of criteria has been satisfied comprises the steps of:
    receiving a user identifier;
    validating the user identifier; and
    determining if a user status includes one of a delinquent account, an exhausted line of credit, a poor credit history, and a non-completion of training requirements.

11. A system to enable an inactive software application resident in memory of a device comprising:
    a computerized network;
    a receiving center connected to the computerized network;
    a processing station located within the receiving center having a processor, wherein the processor is configured to:
    receive a request from a user for activation of at least one inactive software application resident on the device;
    generate an electronic enabler configured to activate the at least one inactive software application;
    transmit the electronic enabler from the receiving center to the device, wherein the device includes a remote processor programmed to:
    control access to the at least one inactive software application;
    verify transmission of the electronic enabler and if transmitted, determine a device operation status;
    if in an active status, prohibit enablement of the at least one inactive software application; and if in an inactive status, enable the at least one inactive software application.

12. The system of claim 11 wherein the remote processor is further programmed to automatically initialize the at least one inactive software application only upon reboot of the device.

13. The system of claim 11 wherein the remote processor is further programmed to automatically initialize the at least one inactive software application upon an authorization of the user.

14. The system of claim 11 wherein the remote processor is further programmed to schedule a software application initialization in response to instructions from the user.

15. The system of claim 11 wherein the device includes a medical device.

16. The system of claim 15 wherein the medical device includes one of a cardiology device, a computed radiology device, a computed tomography device, a magnetic resonance imaging device, an x-ray device, an ultrasound device, a nuclear medicine device, and a position emission tomography device.

17. The system of claim 11 wherein the electronic enabler is electronically transmitted via a private communication line.

18. The system of claim 11 wherein the receiving center is further configured to:
  receive a user identifier;
  validate the user identifier;
  receive a user authentication code;
  validate the user authentication code;
  receive a system identifier; and
  validate the system identifier.

19. The system of claim 11 wherein the electronic enabler is an alphanumeric software key.

20. The system of claim 11 wherein the at least one processor is further configured to deny the request of the user in which the user is identified as having one of a delinquent account, an exhausted line of credit, an open credit history, and a non-completion of a training requirement.

21. The system of claim 11 wherein an active status includes a device in operation.

22. A computer data signal embodied in a carrier wave and representing a sequence of instructions which, when executed by at least one processor, causes the at least one processor to:
  review, at a centralized facility, a request from a user to activate an inactive software application stored in memory of a medical imaging device located remotely from the centralized facility;
  determine whether the user is qualified, and if so:
    generate a software script designed to enable the software application;
    transmit the software script from the centralized facility to the device; and
    enable the software application only during a reboot of the device.

23. The computer data signal of claim 22 wherein the sequence of instructions further causes the processor to notify the user upon enablement of the software application.

24. The computer data signal of claim 22 wherein a qualified user includes a user having a satisfactory billing account.

25. The computer data signal of claim 22 wherein the software script is transmitted to the device over a private communication network.

26. The computer data signal of claim 22 wherein the software application is resident in memory of the medical imaging device.

27. A software enabling system comprising:
  a centralized facility;
  a medical imaging scanner remotely located from the centralized facility and capable of receiving transmissions from the centralized facility, wherein the medical imaging scanner includes a computer having one or more inactive applications resident in memory of the computer; and
  a data script creator designed to generate a data script configured to enable a selected inactive application, wherein the data script is further configured to automatically enable the selected inactive application only upon initialization of the device.

28. The software enabling system of claim 27 wherein the data script creator is further configured to generate a data script specific to at least one of a system identifier, an application identifier, a user identifier, and a host identifier.

29. The software enabling system of claim 27 wherein the centralized facility includes one or more computers configured to receive a request from a user remote from the centralized facility, wherein the one or more computers further includes a computer readable medium having thereon a set of instructions that when executed, causes the one or more computers to transmit the data script to the medical imaging scanner for automatic installation when the medical imaging scanner is inactive.

30. The software enabling system of claim 29 wherein the one or more computers are further configured to determine satisfaction of a set of criteria, wherein the set of criteria includes:
  a valid user identifier;
  a valid system identifier; and
  a qualified customer status.

31. The software enabling system of claim 30 wherein a qualified customer status includes a satisfactory billing status and a compliant training status.

32. The software enabling system of claim 27 wherein the data script is further configured to prevent enabling of the selected inactive application within the medical imaging scanner during device operation.

33. The software enabling system of claim 32 wherein the data script is further configured to prompt a user for authorization to enable the inactive application.

34. The software enabling system of claim 29 wherein the one or more computers are further configured to verify a transmission of the data script and notify a user of the transmission.

* * * * *

UNITED STATES PATENT AND TRADEMARK OFFICE
CERTIFICATE OF CORRECTION

PATENT NO. : 6,829,704 B2
DATED : December 7, 2004
INVENTOR(S) : Zhang et al.

It is certified that error appears in the above-identified patent and that said Letters Patent is hereby corrected as shown below:

Column 11,
Line 20, delete the word "position" and substitute therefore -- positron --

Signed and Sealed this

Twenty-ninth Day of March, 2005

JON W. DUDAS
*Director of the United States Patent and Trademark Office*